(12) United States Patent
Wu

(10) Patent No.: US 12,524,144 B2
(45) Date of Patent: Jan. 13, 2026

(54) HANDWRITING GENERATING METHOD AND APPARATUS, COMPUTER APPARATUS AND READABLE MEDIUM

(71) Applicant: BOE TECHNOLOGY GROUP CO., LTD., Beijing (CN)

(72) Inventor: Yanhong Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 147 days.

(21) Appl. No.: 18/268,267

(22) PCT Filed: Apr. 28, 2022

(86) PCT No.: PCT/CN2022/089957
§ 371 (c)(1),
(2) Date: Jun. 19, 2023

(87) PCT Pub. No.: WO2023/206257
PCT Pub. Date: Nov. 2, 2023

(65) Prior Publication Data
US 2025/0077069 A1 Mar. 6, 2025

(51) Int. Cl.
G06F 3/04883 (2022.01)
(52) U.S. Cl.
CPC .............. G06F 3/04883 (2013.01)
(58) Field of Classification Search
CPC .. G06F 3/04883; G06F 3/03545; G06F 3/038; G06F 3/04845; G06T 11/80; G06V 30/347
See application file for complete search history.

(56) References Cited

U.S. PATENT DOCUMENTS

2021/0166013 A1* 6/2021 Tensmeyer ............. G06N 3/045

FOREIGN PATENT DOCUMENTS

| CN | 102521858 A | 6/2012 |
|----|-------------|--------|
| CN | 103310474 A | 9/2013 |
| CN | 105225260 A | 1/2016 |
| CN | 112102434 A | 12/2020 |
| KR | 101014735 B1 | 2/2011 |

* cited by examiner

Primary Examiner — Yaron Cohen
(74) Attorney, Agent, or Firm — HOUTTEMAN LAW LLC

(57) ABSTRACT

A handwriting generating method is provided. The handwriting includes at least one handwriting segment formed by a brush, and each handwriting segment is generated by: obtaining brush parameters, wherein the brush parameters are determined according to pen type parameters selected by a user, or are set by the user; acquiring sampling points of the handwriting track, and generating a handwriting track curve according to the sampling points; determining positions of the interpolation points on the handwriting track curve, wherein an arc length between any two adjacent interpolation points on the handwriting track curve is constant; and determining the handwriting width of the position of the interpolation point according to the brush parameters, and generating the handwriting according to the brush parameters and the handwriting width.

20 Claims, 9 Drawing Sheets

Mark pen

Pencil

Hard pen

Thick writing brush

Thin writing brush

Quadrangle star, T=d

Quadrangle star, T=2.5*d

Quadrangle star, T=0.5d,
Sine function Discrete

Quadrangle star, T=d, Initial rotation angle of 30°

Quadrangle star, T=d, Larger and smaller brush elements are alternately changed

Quadrangle star, T=d, Rotation by arithmetic angle

Gradient circle T=0.5*d

Gradient circle T=1.2*d

Gradient circle T=1.2*d, The higher the speed is, the smaller the handwriting width is Gradient circle T=1.2*d, The higher the speed is, the larger the handwriting width is

| Obtaining brush parameters, wherein the brush parameters are determined according to pen type parameters selected by a user, or the brush parameters are set by the user, and each brush parameter at least includes a shape or a pattern of a brush element | S1 |

↓

| Acquiring sampling points of the handwriting track, and generating a handwriting track curve according to the sampling points, wherein the handwriting track is a track of one of the handwriting segments | S2 |

↓

| Determining positions of the interpolation points on the handwriting track curve, wherein an arc length between any two adjacent interpolation points on the handwriting track curve is constant | S3 |

↓

| Determining the handwriting width of the position of the interpolation point according to the brush parameters, and generating the handwriting corresponding to the handwriting track curve according to the brush parameters and the handwriting width | S4 |

FIG. 1

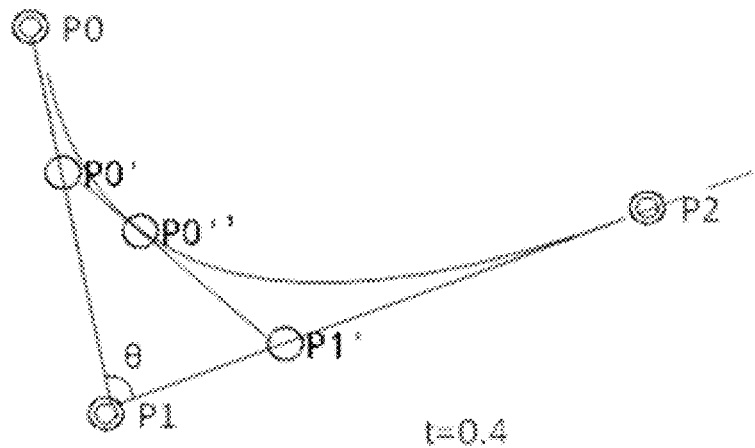

FIG. 2a

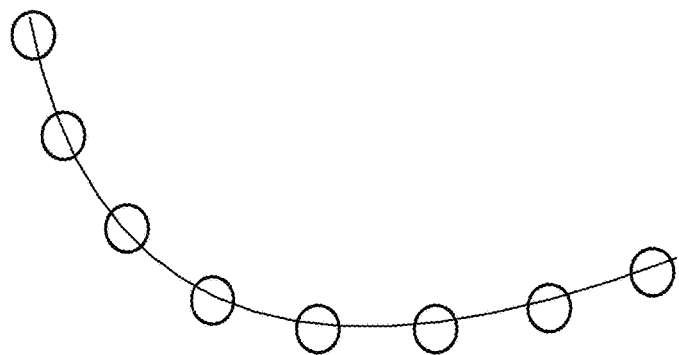

FIG. 2b

| Pen type | Hard pen | Pencil | Mark pen | Thick writing brush | Thin writing brush |
| --- | --- | --- | --- | --- | --- |
| Shape or pattern of brush element | ● | ▨ | ● | ◣ | ◣ |
| Distance T and diameter D | T<0.1*d | T<1*D | T<0.1*D | T<0.1*D | T<0.1*D |
| Rotation angle θ | Not rotate | Each brush element is rotated by an angle θ counterclockwise relative to the previous brush element | Not rotate | Not rotate | Not rotate |
| Handwriting width | Unchanged | Unchanged | Unchanged | The higher the speed is, the smaller the handwriting width is | The higher the speed is, the larger the handwriting width is |
| Handwriting effect | ▬ | ▨▨ | ▬ | ◣◣ | ◣◣ |

FIG. 3

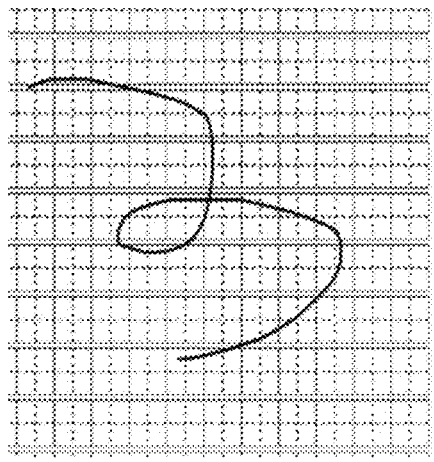 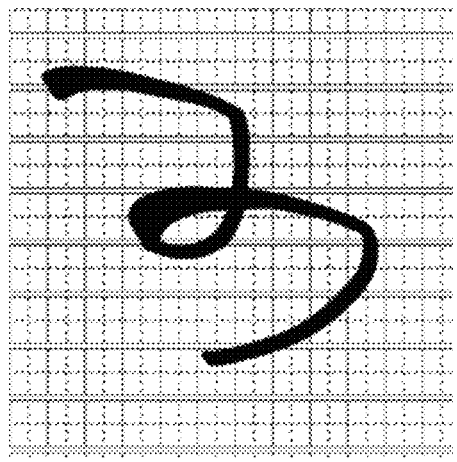
FIG. 4a
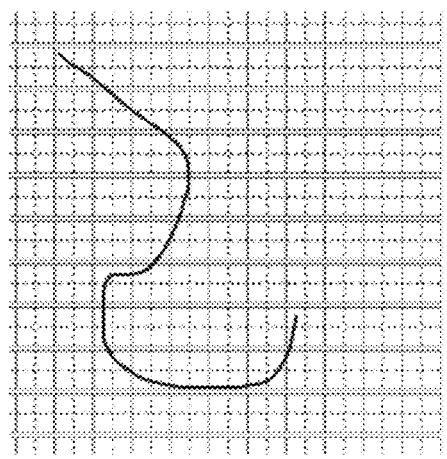 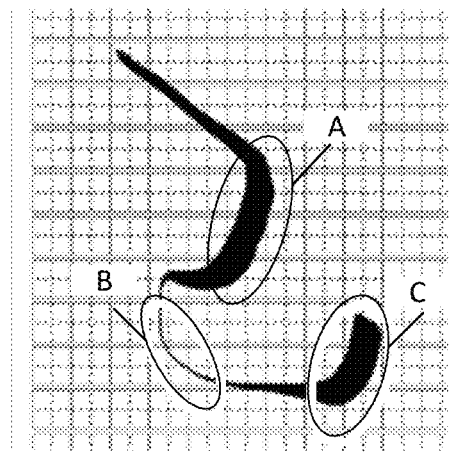
FIG. 4b

HANDWRITING GENERATING METHOD AND APPARATUS, COMPUTER APPARATUS AND READABLE MEDIUM

CROSS-REFERENCE TO RELATED APPLICATION

This is a National Phase Application filed under 35 U.S.C. 371 as a national stage of PCT/CN2022/089957, filed on Apr. 28, 2022, the contents of which are incorporated herein in their entirety by reference.

TECHNICAL FIELD

The present disclosure relates to the field of computer application technology, in particular to a handwriting generating method, a handwriting generating device, a computer apparatus and a readable medium.

BACKGROUND

In the fields of wisdom education, business office, intelligent medical treatment and the like, an electronic interactive white board and other devices, which serve as a convenient tool, play an extremely important role in information interaction and sharing.

However, the current handwriting generating scheme cannot meet the user-defined requirement, and the handwriting generating effect of devices restricts the user experience of the product.

SUMMARY

The present disclosure aims to solve at least one of the technical problems in the prior art and provides a handwriting generating method, a handwriting generating device, a computer apparatus and a readable medium, which have a user-defined effect.

In a first aspect, an embodiment of the present disclosure provides a handwriting generating method, wherein the handwriting includes at least one handwriting segment formed by a brush, and each handwriting segment is generated by: obtaining brush parameters, wherein the brush parameters are determined according to pen type parameters selected by a user, or the brush parameters are set by the user, and each brush parameter at least includes a shape or a pattern of a brush element; acquiring sampling points of a handwriting track, and generating a handwriting track curve according to the sampling points, wherein the handwriting track is a track of one of the at least one handwriting segment; determining positions of the interpolation points on the handwriting track curve, wherein an arc length between any two adjacent interpolation points on the handwriting track curve is constant; and determining a handwriting width of the position of the interpolation point according to the brush parameters, and generating the handwriting corresponding to the handwriting track curve according to the brush parameters and the handwriting width.

In a second aspect, an embodiment of the present disclosure further provides a handwriting generating device, including a parameter obtaining component, a track generating component, an interpolation point determining component, a handwriting width determining component, and a handwriting generating component, wherein the parameter obtaining component is configured to obtain brush parameters, wherein the brush parameters are determined according to pen type parameters selected by a user, or the brush parameters are set by the user, and each brush parameter at least includes a shape or a pattern of a brush element; the track generating component is configured to acquire sampling points of a handwriting track, and generate a handwriting track curve according to the sampling points, wherein the handwriting track is a track of one of handwriting segments; the interpolation point determining component is configured to determine positions of the interpolation points on the handwriting track curve, wherein an arc length between any two adjacent interpolation points on the handwriting track curve is constant; the handwriting width determining component is configured to determine a handwriting width of the position of the interpolation point according to the brush parameters; and the handwriting generating component is configured to generate the handwriting corresponding to the handwriting track curve according to the brush parameters and the handwriting width.

In a third aspect, an embodiment of the present disclosure further provides a computer apparatus, including: one or more processors; a storage device having one or more programs stored thereon; the one or more programs, when executed by the one or more processors, cause the one or more processors to implement the handwriting generating method.

In a fourth aspect, an embodiment of the present disclosure further provides a computer readable medium, on which a computer program is stored, wherein the program is executed to implement the handwriting generating method.

BRIEF DESCRIPTION OF DRAWINGS

FIG. 1 is a first flowchart illustrating a handwriting generating method according to an embodiment of the present disclosure;

FIG. 2a is a schematic diagram of a second-order Bezier curve according to an embodiment of the present disclosure;

FIG. 2b is a schematic diagram of an equal arc length interpolation (interpolation by an equal arc length) according to an embodiment of the present disclosure;

FIG. 3 is a schematic diagram of parameters of various types of pens according to an embodiment of the present disclosure;

FIG. 4a is a comparison diagram of the effects of the handwriting in the prior art and the handwriting of the thick writing brush according to an embodiment of the present disclosure;

FIG. 4b is a comparison diagram of the effects of the handwriting in the prior art and the handwriting of the thin writing brush according to an embodiment of the present disclosure;

DETAIL DESCRIPTION OF EMBODIMENTS

Figure 5:
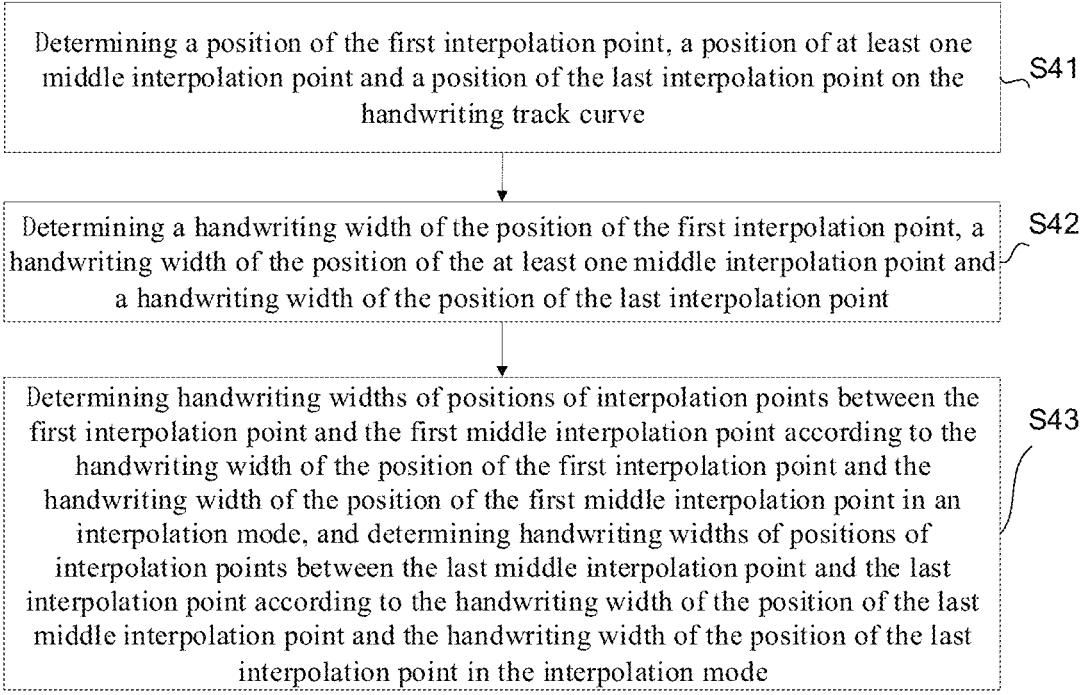
FIG. 5 is a first flowchart for determining a position of an interpolation point according to an embodiment of the present disclosure.

In order to enable one of ordinary skill in the art to better understand the technical solutions of the present invention/utility model, the present invention/utility model will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

The embodiment of the present disclosure provides a handwriting generating method, the handwriting includes at least one handwriting segment formed by a brush, and the at least one handwriting segment may be a touch track of a user's brush on a touch screen of a terminal device. As shown in FIG. 1, the step of generating each handwriting segment includes following Steps 1 to 4:

Step 1 includes obtaining brush parameters, wherein the brush parameters are determined according to pen type parameters selected by a user, or the brush parameters are set by the user, and each brush parameter at least includes a shape or a pattern of a brush element.

The brush parameters may be set by a user, and in some embodiments, a mapping relationship between the pen type parameters and the brush parameters may be preset, in which case, the brush parameters may be determined according to the corresponding pen type parameters selected by the user. In some embodiments, a self-defined brush graphic library may be pre-established in which the brush parameters are selected by the user. In some embodiments, the brush parameters may also be set in the form of vector graphics uploaded by the user.

The brush element refers to a minimum display unit of the brush. For example, the shape of the brush element may be a circle, a quadrangle star, a cross, a gear, or the like, and the pattern of the brush element may be a user-defined pattern, such as a butterfly pattern, a flower pattern, or the like.

Step 2 includes acquiring sampling points of the handwriting track, and generating a handwriting track curve according to the sampling points, wherein the handwriting track is a track of one of the handwriting segments.

In some embodiments, the handwriting track formed by the brush is subjected to sparse sampling to obtain the sampling points, and the handwriting track curve is generated according to the sampling points by using a Bezier curve algorithm. It should be noted that the handwriting track curve may also be a preset track curve used for handwriting smoothing, such as the Bezier curve. However, in the specific handwriting drawing process, the specific handwriting track curve may be obtained only by acquiring the sampling points. For example, the specific Bezier curve may be generated according to the acquired sampling points as control points of the Bezier curve. However, it should be noted that the generated specific Bezier curve is not necessarily displayed on the screen, but is used for subsequently calculating interpolation points.

The Bezier curve is widely applied to graphic design and path planning, a curve shape of the Bezier curve is determined by the control points, and n control points generate an $(n-1)^{th}$-order Bezier curve. The Bezier curve may be generated in a recursive mode.

Taking a second-order Bezier curve as an example, as shown in FIG. 2a, the second-order Bezier curve has three non-collinear control points P0, P1, P2, and a formula of the second-order Bezier curve is the following formula (1):

$$C_2(t) = (1-t)^2 P_0 + 2t(1-t)P_1 + t^2 P_2 \tag{1}$$

where $C_2$ is P0", t is a coefficient for the Bezier curve; $t \in [0,1]$.

In the embodiment of the present disclosure, a second-order Bezier curve algorithm is adopted to generate the handwriting track curve as an example, and thus the three sampling points are taken as the control points.

In some embodiments, the acquiring the sampling points of the handwriting track and generating the handwriting track curve according to the Bezier curve algorithm, includes: acquiring three sampling points of the handwriting track, generating the handwriting track curve by utilizing the Bezier curve algorithm according to the three sampling points, wherein an angle is formed by taking a middle sampling point as a vertex and connecting lines between the vertex and the other two sampling points as sides. That is, the three sampling points are not collinear.

Under the condition that a first angle is larger than a second angle, the number of the interpolation points on a first handwriting track curve is larger than that of the interpolation points on a second handwriting track curve. The first handwriting track curve is generated by the Bezier curve algorithm according to a first group of three sampling points, and the first angle is an angle formed by taking the middle sampling point of the first group of three sampling points as a vertex and connecting lines between the vertex and the other two sampling points of the first group of three sampling points as sides. The second handwriting track curve is generated by the Bezier curve algorithm according to a second group of three sampling points, and the second angle is an angle formed by taking the middle sampling point of the second group of three sampling points as a vertex and connecting lines between the vertex and the other two sampling points of the second group of three sampling points as sides.

Referring to FIG. 2a, for the second order Bezier curve, the three sampling points are P0, P1, and P2, where P1 is used as the vertex, and P0P1 and P2P1 are used as sides to form an angle, the larger the angle is, the longer an arc length of the second-order Bezier curve is, and the more interpolation points are selected on the arc length.

Step 3 includes determining positions of the interpolation points on the handwriting track curve, wherein an arc length between any two adjacent interpolation points on the handwriting track curve is constant.

In the embodiment of the present disclosure, the handwriting track curve may be subjected to equal arc length interpolation by using an iterative algorithm, and the arc length between any two adjacent interpolation points on the interpolated handwriting track curve is constant. It should be noted that the arc length between any two adjacent interpolation points being constant means that the arc lengths T between the interpolation points are substantially the same. It is an ideal state in view of absolute equality, and the subsequent calculation for the arc length involves calculation methods such as approximation, arc length convergence, and iteration, so that the equal arc length interpolation described here does not mean that the arc lengths are absolutely equal to each other, but an error of the arc lengths is within a certain range. In some embodiments, the error range may be 20% or 30%. The arc length between two adjacent interpolation points on the handwriting track curve is r, and for the first interpolation point, the arc length T between the interpolation points is an arc length between the first interpolation point and the first sampling point on the handwriting track curve.

After the handwriting track curve is generated by adopting the Bezier curve algorithm, the equal arc length interpolation is performed on the handwriting track curve to obtain the position of each interpolation point. As shown in FIG. 2b, the interpolation points are evenly distributed on the whole handwriting track curve. By adopting the equal arc length interpolation, a condition can be avoided that a plurality of interpolation points overlap with each other at a curved portion of the handwriting track curve when a curvature radius is smaller, and the handwriting generated according to the brush parameters and a handwriting width of the position of each interpolation point has a better reality degree, thereby improving the presentation effect.

Step 4 includes determining the handwriting width of the position of the interpolation point according to the brush parameters, and generating the handwriting corresponding to the handwriting track curve according to the brush parameters and the handwriting width.

The brush parameters are different, and correspondingly, the handwriting widths of the handwritings formed by the brush parameters are also different. In the step, the handwriting widths of positions of the interpolation points in the handwriting track curve are respectively determined according to the brush parameters, and the handwriting is generated according to the brush parameters and the handwriting width, so that the handwriting with the user-defined effect is presented. The handwriting widths corresponding to different types of brush parameters are different, and the obtained handwriting effects are also different.

In the embodiment of the present disclosure, the brush parameters are determined by the pen type parameters selected by the user or the brush parameters are selected by the user. After the handwriting track curve is generated and the position of the interpolation point in the handwriting track curve is determined, the handwriting width of the position of the obtained interpolation point is determined according to the brush parameters, and the handwriting corresponding to the handwriting track curve is generated according to the brush parameters and the handwriting width of the position of the interpolation point, and thus the handwriting has a line width and user-defined personalized handwriting effect, and the user-defined requirement can be met.

In some embodiments, the brush parameters may further include at least one of: a distance between the brush elements, a diameter of the brush element, and a rotation angle θ of the brush element.

In some embodiments, the pen type parameter includes a first pen type parameter and a second pen type parameter, and the first pen type parameter includes a first pen subtype parameter and a second pen subtype parameter. In the embodiment of the present disclosure, the first pen subtype parameter is a thick writing brush, the second pen subtype parameter is a thin writing brush, and the second type of pen type parameters may include a hard pen, a pencil, a mark pen, or the like.

FIG. 3 shows the brush parameters and writing effect under various pen type parameters. As shown in FIG. 3, the distance T between the brush elements is related to the diameter d of the brush element, and the maximum value of the distance T between the brush elements is determined according to the diameter d of the brush element and the pen type parameter. For example, the distance T between the brush elements is less than 0.1 d, for the hard pen, the marker pen, the thick writing brush, or the thin writing brush; and the distance T between the brush elements is less than d for the pencil. The handwriting width corresponding to the second type of pen type parameters such as the hard pen, the pencil, the mark pen and the like is always unchanged, the handwriting width of the thick writing brush (namely the first pen subtype parameter) is reduced as the increase of the writing speed, and the handwriting width of the thin writing brush (namely the second pen subtype parameter) is increased as the increase of the writing speed.

As shown in FIG. 4a, the handwriting width of the handwriting is not changed in the prior art, which cannot present the pen type characteristics. But in the handwriting of the thick writing brush of the present disclosure, at the starting position and the curved portion of the handwriting, the writing speed is relatively low, the handwriting width at the corresponding position is wide, the writing speed is relatively high during the writing process, and the handwriting width at the corresponding position is narrow, which can present the pen type characteristics of the thick writing brush. As shown in FIG. 4b, the handwriting width of the handwriting is not changed in the prior art, which cannot present and the pen type characteristic, but in the handwriting of the thin writing brush of the present disclosure, the writing speed is higher and the handwriting width is wider at the position A and the position C, the writing speed is lower and the handwriting width is narrower at the position B, which can present the pen type characteristic of the thin writing brush.

In some embodiments, in the process of generating the handwriting corresponding to the handwriting track curve according to the brush parameters and the handwriting width, handwriting effect parameters may also be superimposed at the positions of the interpolation points, and the handwriting effect parameters may include color, transparency, and the like. It should be noted that for the mark pen, the transparency must be superimposed at the positions of the interpolation points to form the handwriting with the mark pen effect.

In some embodiments, the determining positions of the interpolation points on the handwriting track curve (i.e., the above Step 3), includes: determining the positions of the interpolation points on the handwriting track curve according to the diameter of the brush element and the distance between the brush elements.

In some embodiments, the arc length τ between the interpolation points is determined, and the positions of the interpolation points on the handwriting track curve are determined according to the arc length τ between the interpolation points, wherein the arc length τ between the interpolation points may be determined according to the diameter of the brush element and the distance between the brush elements.

In some embodiments, the arc length τ between the interpolation points may be determined by formula (2):

$$\tau = M * d \quad (2)$$

where M is a coefficient and d is the diameter of the brush element.

In some embodiments, the coefficient M is determined according to the distance T between the brush elements, and the smaller the distance T between the brush elements is, the smaller the coefficient M is; the larger the distance T between the brush elements, the larger the coefficient M.

In some embodiments, in the case that the pen type parameter is the first pen type parameter, as shown in FIG. 5, the determining the handwriting width of the position of the interpolation point according to the brush parameters (i.e., the above Step 4), includes following Step 41 to Step 43.

Step 41 includes determining a position of the first interpolation point, a position of at least one middle interpolation point and a position of the last interpolation point on the handwriting track curve.

In the embodiment of the present disclosure, as an example, the handwriting track curve is the second-order Bezier curve, and the at least one middle interpolation point includes one middle interpolation point, the positions of three interpolation points are determined in this step. After the positions of the interpolation points on the handwriting track curve are determined as shown in FIG. 2b, the first interpolation point M0, the middle interpolation point M1 and the last interpolation point M2 on the handwriting track curve are determined. The position of the first interpolation point M0 is (x0, y0), the position of the middle interpolation point M1 is (x1, y1), and the position of the last interpolation point M2 is (x2, y2).

Step 42 includes determining a handwriting width of the position of the first interpolation point, a handwriting width of the position of the at least one middle interpolation point and a handwriting width of the position of the last interpolation point.

In this step, the handwriting width D0 of the position of the first interpolation point M0, the handwriting width D1 of the position of the middle interpolation point M1 and the handwriting width D2 of the position of the last interpolation point M2 are respectively determined.

Step 43 includes determining handwriting widths of positions of interpolation points between the first interpolation point and the first middle interpolation point according to the handwriting width of the position of the first interpolation point and the handwriting width of the position of the first middle interpolation point in an interpolation mode, and determining handwriting widths of positions of interpolation points between the last middle interpolation point and the last interpolation point according to the handwriting width of the position of the last middle interpolation point and the handwriting width of the position of the last interpolation point in the interpolation mode.

In this step, for the handwriting widths of the positions of the interpolation points determined in Step 42, the handwriting widths of positions of interpolation points between the interpolation points corresponding to two adjacent handwriting widths are determined in the interpolation mode. That is, the entire handwriting track curve is divided into 2 segments, i.e., a handwriting track curve segment M0M1 and a handwriting track curve segment M1M2, by using the first interpolation point M0, the middle interpolation point M1 and the last interpolation point M2, and the handwriting widths of positions of the interpolation points between the points M0 and M1 on the handwriting track curve segment M0M1 and the handwriting widths of positions of the interpolation points between the points M1 and M2 are determined on the handwriting track curve segment M1M2 in the interpolation mode, respectively.

It should be noted that if it is determined that a plurality of middle interpolation points Mix exist between the first interpolation point M0 and the last interpolation point M2 in Step 41, and the handwriting width D1x at the position of each middle interpolation point Mix is determined in Step 42, in this step, it is necessary to determine the handwriting widths of the positions of the interpolation points between two adjacent middle interpolation points $M1_{(x-1)}$ and $M1_x$ in the interpolation mode, respectively.

In some embodiments, the handwriting widths of the positions of the interpolation points between the first interpolation point and the first middle interpolation point and the handwriting widths of the positions of the interpolation points between the last middle interpolation point and the last interpolation point are determined in a linear interpolation mode. The handwriting widths of the positions of the interpolation points in the middle of the handwriting track curve are determined in the linear interpolation mode, thereby simplifying the algorithm complexity and improving the generating speed of the handwriting.

In order to avoid the phenomenon of handwriting distortion caused by too large handwriting widths of the thick writing brush and the thin writing brush or the phenomenon of stroke disconnection caused by too small handwriting widths of the thick writing brush and the thin writing brush, and to ensure the authenticity and integrity of the handwriting, in the embodiment of the present disclosure, the handwriting widths of the thick writing brush and the thin writing brush are adjusted, and the handwriting widths of the thick writing brush and the thin writing brush are limited within a certain numerical range.

Figure 6:
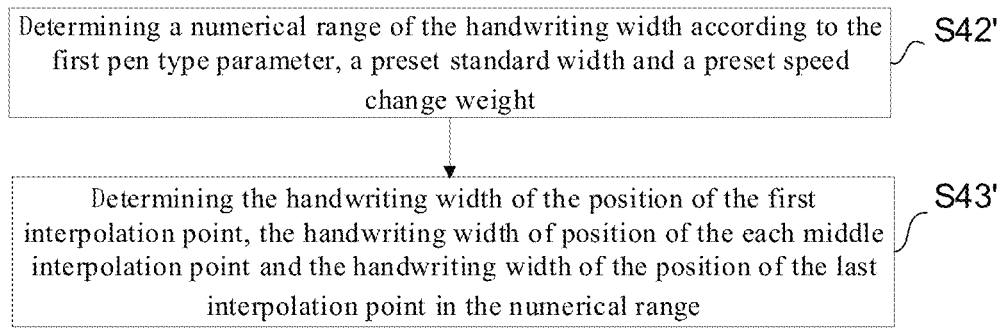
FIG. 6 is a schematic flowchart for adjusting a handwriting width according to an embodiment of the present disclosure.

Thus, in some embodiments, after the determining the handwriting width of the position of the first interpolation point, the handwriting width of the position of the at least one middle interpolation point and the handwriting width of the position of the last interpolation point (i.e., Step 42), and before the determining handwriting widths of positions of interpolation points between the first interpolation point and the first middle interpolation point according to the handwriting width of the position of the first interpolation point and the handwriting width of the position of the first middle interpolation point in the interpolation mode, and determining handwriting widths of positions of interpolation points between any two adjacent middle interpolation points according to the order of the middle interpolation points and the handwriting widths of the positions of the middle interpolation points in the interpolation mode and determining handwriting widths of positions of interpolation points between the last middle interpolation point and the last interpolation point according to the handwriting width of the position of the last middle interpolation point and the handwriting width of the position of the last interpolation point in the interpolation mode (i.e., Step 43), as shown in FIG. 6, the handwriting generating method further includes following step 42' to step 43':

Step 42' includes determining a numerical range of the handwriting width according to the first pen type parameter, a preset standard width and a preset speed change weight.

The first pen type parameter includes a first pen subtype parameter (the thick writing brush) and a second pen subtype parameter (the thin writing brush), a numerical range of the handwriting width corresponding to the thick writing brush is different from that of the handwriting width corresponding to the thin writing brush, and the numerical range is determined according to the preset standard width D and the preset speed change weight λ.

Step 43' includes determining the handwriting width of the position of the first interpolation point, the handwriting width of position of the each middle interpolation point and the handwriting width of the position of the last interpolation point in the numerical range.

In this step, if any one or more of the handwriting width D0 of the position of the first interpolation point M0, the handwriting width D1x of the position of each middle interpolation point M1x, and the handwriting width D2 of the position of the last interpolation point M2 exceeds the numerical range corresponding to a first pen type parameter, the handwriting width exceeding the numerical range is adjusted to be within the numerical range. That is, the handwriting width smaller than the lower limit of the numerical range is adjusted to the lower limit of the numerical range, and the handwriting width larger than the upper limit of the numerical range is adjusted to the upper limit of the numerical range.

In some embodiments, if the first pen type parameter is the first pen subtype parameter (i.e., the thick writing brush), the speed change weight λ is less than 1 and greater than 0; if the first pen type parameter is the second pen subtype parameter (i.e. the thin writing brush), the speed change weight λ is less than 0 and greater than −1. Therefore, the handwriting width of the first pen sub type parameter (i.e., the thick writing brush) is in a numerical range of $[(1-\lambda)\times D, D]$, and the handwriting width of the second pen subtype parameter (i.e., the thin writing brush) is in a numerical range of $[(1+\lambda)\times D, D]$. The relevant parameters of the thick writing brush and the thin writing brush are shown in table 1:

TABLE 1

| Pen type parameters | Sign of λ | Initial handwriting width (Dlast) | Maximum handwriting width | Minimum handwriting width | Range of value λ |
|---|---|---|---|---|---|
| Thick writing brush | + | D | D | $(1 - \lambda) \times D$ | (0, 1) |
| Thin writing brush | − | $(1 + \lambda) \times D$ | D | $(1 + \lambda) \times D$ | (−1, 0) |

Figures 7A, 7B:
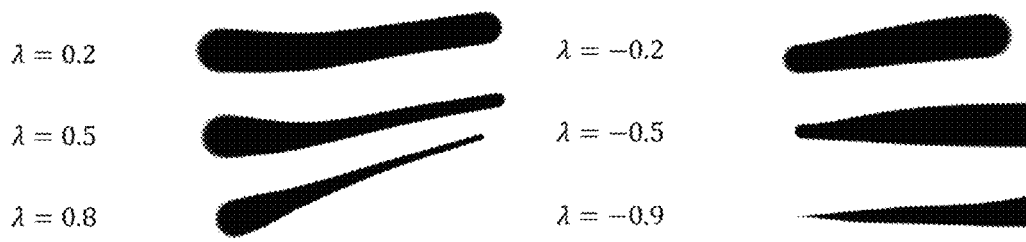
FIG. 7a is an effect diagram of the handwriting of the thick writing brush at different λ according to an embodiment of the present disclosure.
FIG. 7b is an effect diagram of the handwriting of the thin writing brush at different λ according to an embodiment of the present disclosure.

FIG. 7a shows the effect of the handwriting of the thick writing brush at different λ. As shown in FIG. 7a, for the pen type of the thick writing brush, the larger an absolute value of the speed change weight λ is, the smaller the minimum handwriting width is, and the more obvious the handwriting width change is.

FIG. 7b shows the effect of the handwriting of the thin writing brush at different λ. As shown in FIG. 7a, for the pen type of the thin writing brush, the larger the absolute value of the speed change weight λ is, the smaller the minimum handwriting width is, and the more obvious the handwriting width change is.

Figure 8:
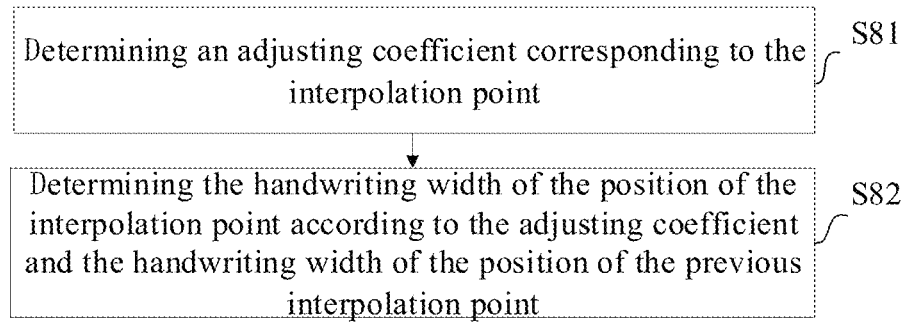
FIG. 8 is a second flowchart for determining a handwriting width of a position of an interpolation point according to an embodiment of the present disclosure.

In some embodiments, as shown in FIG. 8, in the case that the pen type parameter is a first pen type parameter (i.e. the thick writing brush or the thin writing brush), the determining the handwriting width of the position of each interpolation point of the first interpolation point M0, each middle interpolation point M1x and the last interpolation point M2, includes following Step 81 to Step 82:

Step 81 includes determining an adjusting coefficient corresponding to the interpolation point.

The interpolation point in this step is one of the first interpolation point M0, each middle interpolation point M1x, and the last interpolation point M2, and different interpolation points have different adjusting coefficients.

Step 82 includes determining the handwriting width of the position of the interpolation point according to the adjusting coefficient and the handwriting width of the position of the previous interpolation point.

In this step, the handwriting width of the position of the current interpolation point is obtained by adjusting the handwriting width of the position of the previous interpolation point using the adjusting coefficient of the current interpolation point. Taking including one middle interpolation point (i.e., M1) as an example, if the current interpolation point is the middle interpolation point M1, the previous interpolation point is the first interpolation point M0; if the current interpolation point is the last interpolation point M2, the previous interpolation point is the middle interpolation point M1. The handwriting width of the position of the interpolation point may be calculated according to the formula (3):

$$D_t = k_t * D_{t-1} \qquad (3)$$

where $D_t$ is the handwriting width of the position of the interpolation point, $D_{t-1}$ is the handwriting width of the position of the previous interpolation point, $k_t$ is the adjusting coefficient corresponding to the interpolation point.

Figure 9:
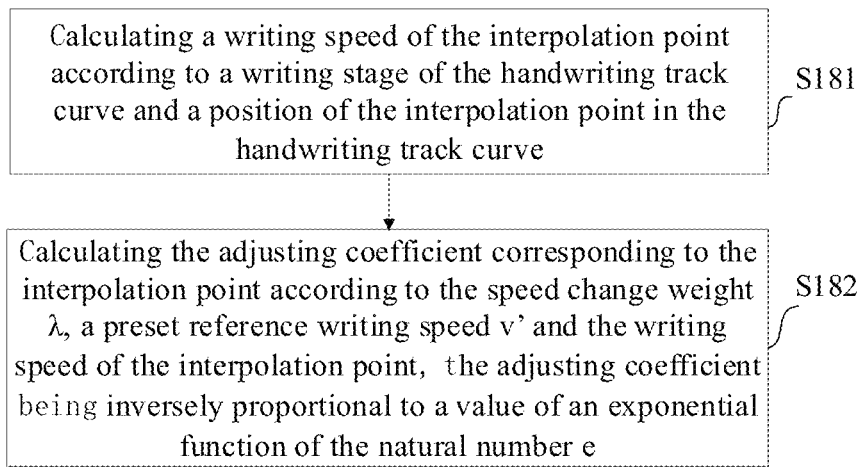
FIG. 9 is a schematic flowchart for determining an adjustment coefficient corresponding to an interpolation point according to an embodiment of the present disclosure.

In some embodiments, as shown in FIG. 9, the determining the adjusting coefficient corresponding to the interpolation point (i.e., Step 81), includes following Step 181 to Step 182:

Step 181 includes calculating a writing speed of the interpolation point according to a writing stage of the handwriting track curve and a position of the interpolation point in the handwriting track curve.

The writing stage of the handwriting track curve includes the following four stages: a stage 1 of a writing-starting stage, a stage 2 of a writing-stopping stage, a stage 3 including writing-starting and writing-stopping, and a stage 0 of a middle stage without writing-starting and writing-stopping. The four stages may be marked respectively, and the handwriting track curve generated by each sampling only belongs to one of the four stages.

The position of the interpolation point in the handwriting track curve refers to whether the interpolation point is the first interpolation point in the handwriting track curve.

Step 182 includes calculating the adjusting coefficient corresponding to the interpolation point according to the speed change weight λ, a preset reference writing speed v' and the writing speed of the interpolation point.

Taking the thick writing brush as an example, in a condition that the handwriting is formed by using the brush of the thick writing brush, the handwriting width $D_t$ of the position of the interpolation point changes along with the change of the writing speed in the writing process, and the reference writing speed is v'. When the current writing speed vt>the reference writing speed v', the current handwriting width $D_t$ becomes thin, that is, the current handwriting width $D_t$ is obtained by the handwriting $D_{t-1}$ of the position of the previous interpolation point multiplied by the adjusting coefficient $k_t$, where $k_t<1$. When the current writing speed vt is smaller than the reference writing speed v', the current handwriting width $D_t$ becomes thicker, that is, the current handwriting width $D_t$ is obtained by the handwriting $D_{t-1}$ of the position of the previous interpolation point multiplied by the adjusting coefficient $k_t$, where $k_t>1$.

Therefore, the embodiment of the present disclosure establishes a functional relation between the handwriting width and the writing speed. The adjusting coefficient is inversely proportional to a value of an exponential function of the natural number e. Since the exponential function of the natural number e has the characteristic that the adjusting coefficient $k_t$ varies, when the argument of the exponential function is a positive number, the value of the exponential function is greater than 1, the value of $k_t$ is less than 1, and when the argument of the exponential function is a negative number, the value of the exponential function is less than 1, and the value of $k_t$ is greater than 1. Therefore, the formula (4) for calculating the adjusting coefficient $k_t$ corresponding to the interpolation point is as follows:

$$k_t = \frac{2}{1 + e^{\lambda \cdot \frac{v_t - v'}{v'}}} \quad (4)$$

where vt is the writing speed of the interpolation point, v' is the preset reference writing speed, λ is the speed change weight, when the pen type parameter is the thick writing brush, $0<\lambda<1$, and when the pen type parameter is the thin writing brush, $-1<\lambda<0$. The absolute value of a is used for controlling the change rate of the adjusting coefficient $k_t$, the larger the absolute value of λ is, the more faster the change of the adjusting coefficient $k_t$ is, and correspondingly, the more obvious the change of the handwriting width is; the smaller the absolute value of λ is, the slower the change of the adjusting coefficient $k_t$ is, and correspondingly, the smaller the change of the handwriting width is.

For the pen type of the thin writing brush, in the writing process, the handwriting width $D_t$ of the position of the interpolation point changes as the change of the writing speed, and the reference writing speed is v'. When the current writing speed vt is larger than the reference writing speed v', the current handwriting width $D_t$ becomes thicker; when the current writing speed vt is smaller than the reference writing speed v', the current handwriting width $D_t$ becomes thin. In the case that the pen type parameter is the pen type of the thin writing brush, the calculation formula of the adjusting coefficient $k_t$ corresponding to the interpolation point is also formula (4), but the speed change weight λ satisfies $-1<\lambda<0$.

In some embodiments, the calculating a writing speed of the interpolation point according to a writing stage of the handwriting track curve and a position of the interpolation point in the handwriting track curve (i.e., Step 181), includes following steps:

In response to the handwriting track curve being in the writing-starting stage (stage 1) or in the stage including writing-starting and writing-stopping (stage 3) and the interpolation point being the first interpolation point in the handwriting track curve, the writing speed v0 of the interpolation point is zero, that is, v0=0.

In response to the handwriting track curve being in the writing-starting stage (stage 1) or in the stage including writing-starting and writing-stopping (stage 3) or in the writing-stopping stage (stage 2) or in the middle stage (stage 0) and the interpolation point being not the first interpolation point in the handwriting track curve, the writing speed of the interpolation point is calculated according to the position and moment of the interpolation point and the position and moment of the previous interpolation point. That is to say, the writing speeds of the middle interpolation point and the last interpolation point in the handwriting track curve are independent of the writing stage of the handwriting track curve to which the interpolation point belongs, and the writing speed of the interpolation point is calculated according to the positions and the moments of the interpolation point and the previous interpolation point.

In response to the handwriting track curve being in the writing-stopping stage (stage 2) or the middle stage (stage 0) and the interpolation point being the first interpolation point in the handwriting track curve, the writing speed of the interpolation point is calculated according to the position and the moment of the interpolation point and the position and the moment of the middle interpolation point of the previous track segment. That is to say, the first interpolation point in the handwriting track curve in the stages without writing-starting coincides with the last interpolation point in the previous track segment, and the writing speed may be calculated according to the writing speed of the last interpolation point in the previous track segment.

In some embodiments, the moment of the interpolation point is based on the sampling moment of the sampling point corresponding to the interpolation point. Taking the handwriting track curve of the second-order Bezier curve as an example, sampling moments t0, t1 and t2 corresponding to three sampling points P0, P1 and P2 respectively serve as a moment of the first interpolation point M0 in the handwriting track curve, a moment of the middle interpolation point M1 in the handwriting track curve and a moment of the last interpolation point M2 in the handwriting track curve.

In some embodiments, the determining the handwriting width of the position of the interpolation point according to the adjusting coefficient and the handwriting width of the position of the previous interpolation point (Step 82), includes: in response to the handwriting track curve being in the writing-starting stage (stage 1) or in the stage including writing-starting and writing-stopping (stage 3) and the interpolation point being the first interpolation point in the handwriting track curve, determining the handwriting width of the position of the interpolation point according to the adjusting coefficient and the initial handwriting width Dlast, wherein the initial handwriting width Dlast is determined according to the first pen type parameter. That is, for the first interpolation point in the handwriting track curve in the stage of the writing-starting, when the handwriting width of the position of the interpolation point is calculated by using the formula (3), the handwriting width $D_{r-1}$ of the position of the previous interpolation point is the initial handwriting width Dlast, and the initial handwriting widths Dlast are different for the pen types of the thick writing brush and the thin writing brush.

The writing width of the thick writing brush is reduced as the increase of the writing speed, and the writing width of the thin writing brush is increased as the increase of the writing speed, so that the initial writing width of the thick writing brush is larger than that of the thin writing brush. In some embodiments, as shown in table 1, if the pen type parameter indicates the thick writing brush, the initial handwriting width Dlast is a standard width D; if the pen type parameter indicates the thin writing brush, the initial handwriting width Dlast is (1+λ) times of the standard width D.

With reference to table 1 and FIG. 7a, for the pen type of the thick writing brush, the initial handwriting widths Dlast corresponding to different speed change weights λ are the same and are all standard widths D. As shown in table 1 and FIG. 7b, for the pen type of the thin writing brush, the initial handwriting widths Dlast corresponding to different speed change weights λ are different, and the larger the absolute value of the speed change weight λ is, the smaller the initial handwriting width Dlast is.

It should be noted that in another embodiment of the present disclosure, the handwriting width of the position of each interpolation point may also be determined without using the linear interpolation mode, but the handwriting width of the current interpolation point is obtained by sequentially adjusting and calculating based on the handwriting width of the previous interpolation point according to the above formula (3) and formula (4) and the order of the interpolation points on the handwriting track curve. As known to one of ordinary skill in the art, this method for calculating the handwriting width of the position of each interpolation point is more complex and consumes more time than the method for calculating the handwriting width of the position of the interpolation point in the linear interpolation mode.

For clearly explaining the solution according to an embodiment of the present disclosure, the process of determining the handwriting width of each interpolation point in the linear interpolation mode will be described in detail below with reference to FIG. 2a and FIG. 2b.

As shown in FIG. 2a, the moments for acquiring the three sampling points P0, P1, and P2 are t0, t1, and t2, respectively, the handwriting track curve of FIG. 2b is generated by using the three sampling points P0, P1, and P2, and the position of each interpolation point on the handwriting track curve is determined. The moment of the first interpolation point M0 is assigned t0, the moment of the middle interpolation point M1 is assigned t1, and the moment of the last interpolation point M2 is assigned t2. The first interpolation point M0 is located at (x0, y0), the middle interpolation point M1 is located at (x1, y1), and the last interpolation point M2 is located at (x2, y2).

If the handwriting track curve is in the writing-starting stage (stage 1) or the stage including the writing-starting and writing-stopping (stage 3), the writing speed of the first interpolation point M0 is v0, v0=0; the writing speed of the middle interpolation point M1 is v1, $$v1 = \frac{\sqrt[3]{(x1-x0)^2 + (y1-y0)^2}}{t1-t0},$$

and the writing speed of the last interpolation point M2 is v2, $$v2 = \frac{\sqrt[3]{(x2-x1)^2 + (y2-y1)^2}}{t2-t1}.$$

If the handwriting track curve is in the writing-stopping stage (stage 2) or the middle stage (stage 0), the writing speed of the first interpolation point M0 is v0, $$v0 = \frac{\sqrt[3]{(x2'-x1')^2 + (y2'-y1')^2}}{t2'-t1'},$$

where ($x_1$', y1') is the position coordinate of the middle interpolation point of the previous track segment, and (x2', y2') is the position coordinate of the last interpolation point of the previous track segment, which is also the position coordinate of the first interpolation point M0 of the current track segment. The writing speed of the middle interpolation point M1 is v1, $$v1 = \frac{\sqrt[3]{(x1-x0)^2 + (y1-y0)^2}}{t1-t0};$$

the writing speed of the last interpolation point M2 is v2, $$v2 = \frac{\sqrt[3]{(x2-x1)^2 + (y2-y1)^2}}{t2-t1}.$$

After the writing speed v0 of the first interpolation point M0, the writing speed v1 of the middle interpolation point M1 and the writing speed v2 of the last interpolation point M2 are obtained through calculation, the adjusting coefficient $k_0$ of the first interpolation point M0, the adjusting coefficient $k_1$ of the middle interpolation point M1 and the adjusting coefficient $k_2$ of the last interpolation point M2 are respectively calculated according to formula (4), wherein when v0=0, $k_0$=1.

The handwriting width D0 of the position of the first interpolation point M0, the handwriting width D1 of the position of the middle interpolation point M1 and the handwriting width D2 of the position of the last interpolation point M2 are respectively calculated according to the formula (3), wherein D0=$k_0$×Dlast, D1=$k_1$×D0 and D2=$k_2$×D1. If the handwriting track curve is in the writing-starting stage (stage 1) or the stage including the writing-starting and writing-stopping (stage 3), in the case of the pen type of the thick writing brush, Dlast=D (D is the standard width), and in the case of the pen type of the thin writing brush, Dlast=(1+λ)×D.

The numerical range of the handwriting width is determined. If any one of the handwriting width D0 of the first interpolation point M0, the handwriting width D1 of the middle interpolation point M1 and the handwriting width D2 of the last interpolation point M2 is beyond the numerical range, the handwriting width beyond the numerical range is adjusted to ensure that the handwriting widths of the 3 interpolation points are all within the numerical range.

The linear interpolation is performed according to the handwriting width D0 of the position of the first interpolation point M0 and the handwriting width D1 of the position of the middle interpolation point M1, to obtain the handwriting width of each interpolation point between the first interpolation point M0 and the middle interpolation point M1, and the linear interpolation is performed according to the handwriting width D1 of the position of the middle interpolation point M2 and the handwriting width D2 of the position of the last interpolation point M2, to obtain the handwriting width of each interpolation point between the middle interpolation point M1 and the last interpolation point M2.

Figure 10:
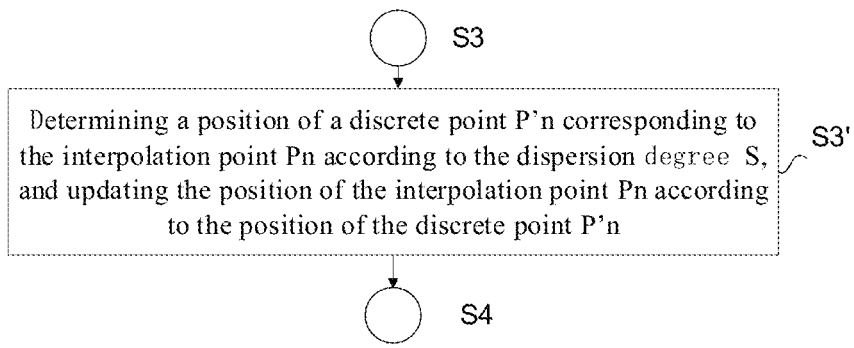
FIG. 10 is a second flowchart illustrating a handwriting generating method according to an embodiment of the present disclosure.

In some embodiments, in a case where the brush parameter is set by the user, the brush parameter may further include dispersion degree S indicating a degree to which the position of the interpolation point deviates from the handwriting track curve. Correspondingly, as shown in FIG. 10, after the determining the position of the interpolation point on the handwriting track curve (i.e., Step 3), and before the generating the handwriting corresponding to the handwriting track curve according to the brush parameter and the handwriting width (i.e., step 4), the handwriting generating method may further include following Step 3':

Step 3' includes determining a position of a discrete point P'n corresponding to the interpolation point Pn according to the dispersion degree S, and updating the position of the interpolation point Pn according to the position of the discrete point P'n.

Figure 11:
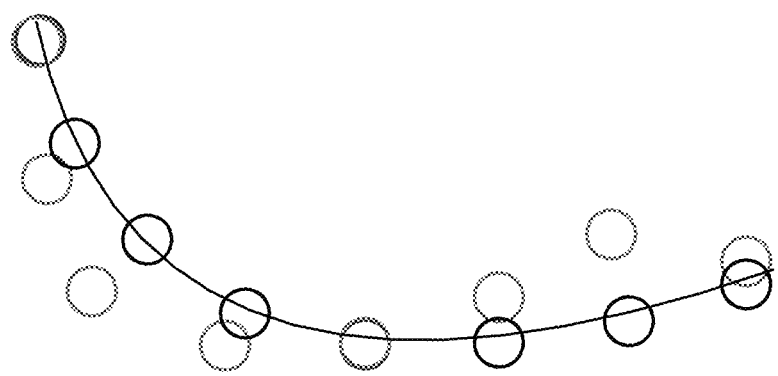
FIG. 11 is a schematic diagram of a discrete effect according to an embodiment of the present disclosure.

FIG. 11 shows the effect of the interpolation point deviating from the handwriting track curve at a certain dispersion degree. As shown in FIG. 11, the points on the handwriting track curve are determined interpolation points, and each point outside the handwriting track curve is a discrete point corresponding to the interpolation point.

In this step, after the position of the discrete point P'n is determined, the position of the interpolation point Pn is updated by using the position of the discrete point P'n. In the subsequent Step 4, the handwriting is generated according to the pen type parameters and the handwriting width of the position of the interpolation point corresponding to the discrete point P'n, so that the obtained handwriting is closer to the real handwriting effect.

Figure 12:
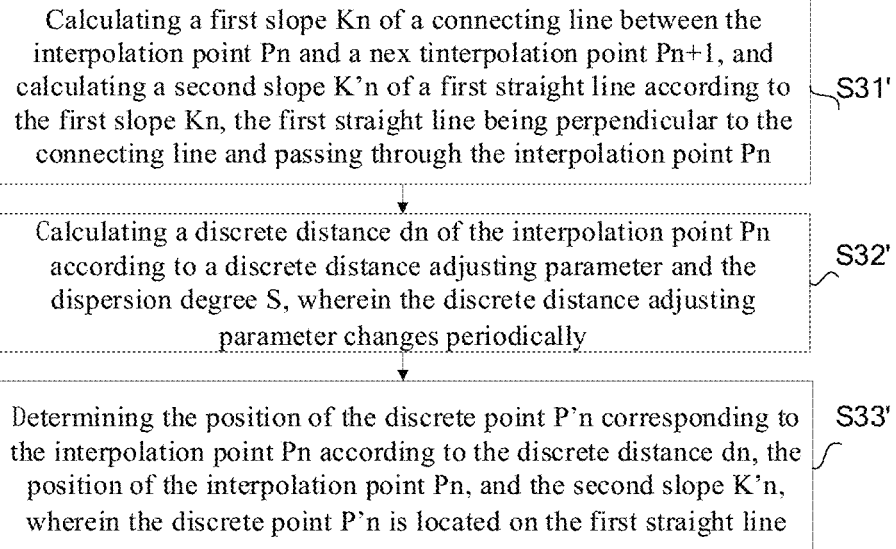
FIG. 12 is a schematic flowchart for determining a position of a discrete point corresponding to an interpolation point according to an embodiment of the present disclosure.
Figure 13:
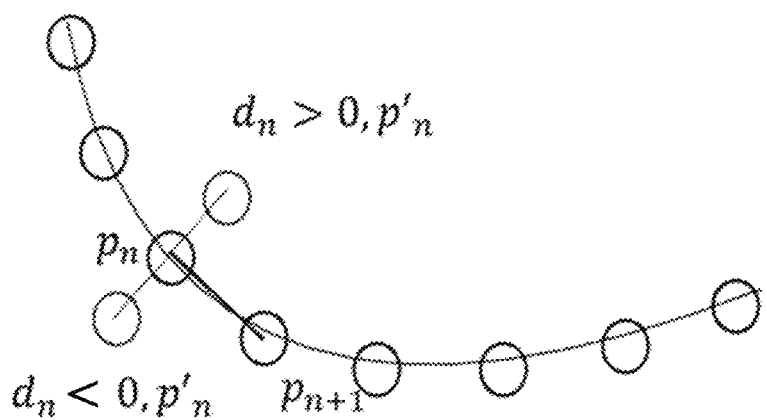
FIG. 13 is a schematic diagram for determining a position of a discrete point according to an embodiment of the present disclosure.

In some embodiments, as shown in FIGS. 12 and 13, the determining the position of the discrete point corresponding to the interpolation point includes following Step 31' to Step 33':

Step 31' includes calculating a first slope Kn of a connecting line between the interpolation point Pn and a next interpolation point Pn+1, and calculating a second slope K'n of a first straight line according to the first slope Kn, the first straight line is perpendicular to the connecting line and passes through the interpolation point Pn.

As shown in FIG. 13, taking the third interpolation point Pn in the handwriting track curve shown in FIG. 13 as an example, the fourth interpolation point is Pn+1, the position of the interpolation point Pn is $(x_n, y_n)$, and the position of the interpolation point Pn+1 is $(x_n+1, y_n+1)$. The slope of the connecting line between the interpolation point Pn and the interpolation point Pn+1 is the first slope Kn, $$K_n = \frac{y_{n+1} - y_n}{x_{n+1} - x_n}.$$

The first straight line passing through the interpolation point Pn and perpendicular to the connecting line has the second slope of K'n, $$K'_n = \frac{-1}{K_n}.$$

Step 32' includes calculating a discrete distance dn of the interpolation point Pn according to a discrete distance adjusting parameter and the dispersion degree S, wherein the discrete distance adjusting parameter changes periodically.

In some embodiments, the discrete distance adjustment parameter is determined according to the ordering of the interpolation point Pn on the handwriting track curve. The ordering n of the interpolation point Pn on the handwriting track curve refers to the sequence number of the interpolation point Pn on the handwriting track curve.

In the step, a pseudo-random angle α is randomly selected within the range of [0,2π], and the discrete distance adjusting parameter is calculated according to a trigonometric function of α and the sequence number of interpolation points Pn on the handwriting track curve, and the discrete distance adjustment parameter is sin(n*α). In the embodiment of the present disclosure, a sine function is taken as an example for description, and it should be noted that other trigonometric functions may be used to calculate the discrete distance dn.

The discrete distance dn refers to a distance between the discrete point P'n and the interpolation point Pn. The discrete distance may be calculated according to the following formula (5):

$$dn = S * \sin(n * \alpha) \qquad (5)$$

where n represents the sequence number of the interpolation point on the handwriting track curve.

Step 33' includes determining the position of the discrete point P'n corresponding to the interpolation point Pn according to the discrete distance dn, the position of the interpolation point Pn, and the second slope K'n, wherein the discrete point P'n is located on the first straight line.

Assuming that the position of the discrete point P'n is (x'n, y'n), the discrete distance is $$|dn| = \sqrt[2]{(x'_n - x_n)^2 + (y'_n - y_n)^2}.$$

In this step, the formula set (6) is solved according to the dn value calculated in Step 32', and thus the position (x'n, y'n) of the discrete point P'n may be obtained. The formula set (6) is as follows:

$$\begin{cases} K'_n = \dfrac{y'_n - y_n}{x'_n - x_n} \\ |dn| = \sqrt[2]{(x'_n - x_n)^2 + (y'_n - y_n)^2} \end{cases} \quad (6)$$

As shown in FIG. 13, when dn<0, the discrete point P'n is on the left of the interpolation point Pn, that is, $x'_n < x_n$; when dn>0, the discrete point P'n is on the right of the interpolation point Pn, that is, $x'_n > x_n$.

In some embodiments, the brush parameters may further include a rotation angle θ of the brush element, where the rotation angle θ of the brush element is an angle difference between two adjacent brush elements, and the angle difference between any two adjacent brush elements is the same, π/4≤θ≤3π/4.

Taking the handwriting is implemented by the pen type of the pencil as an example, in the process of generating the handwriting track, the brush element of the pencil is rotated to simulate the effect of irregular handwriting track of the pencil. In the embodiment of the present disclosure, a pseudo-random angle θ is randomly selected in a rotation angle range of [π/4, 3π/4] as the angle difference between two adjacent brush elements, namely each brush element is rotated by angle θ relative to the previous brush element, that is, $\theta_n = \theta_{n-1} + \theta$.

Figure 14:
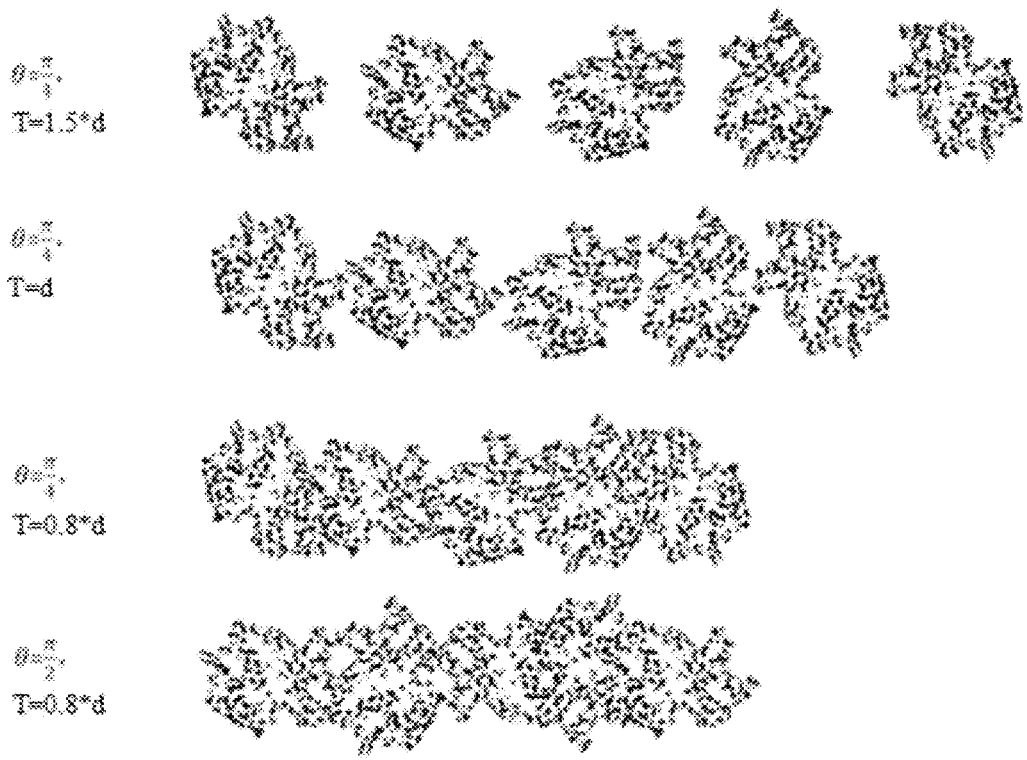
FIG. 14 is a schematic diagram illustrating handwriting effects corresponding to different rotation angles θ in a pencil according to an embodiment of the present disclosure.

FIG. 14 is a schematic diagram illustrating handwriting effects corresponding to different rotation angles θ in a pencil. As shown in FIG. 14, the brush elements are rotated counterclockwise in sequence, where the handwriting effects are as follows: in the first row, θ=π/4, and the distance between the brush elements is 1.5 times of the diameter of the brush element (i.e., T=1.5 d); in the second row, θ=π/4 and the distance between the brush elements is 1 time of the diameter of the brush element (i.e., T=d); in the third row, θ=π/4, and the distance between the brush elements is 0.8 times of the diameter of the brush element (i.e., T=0.8 d); and in the fourth row, θ=π/2 and the distance between the brush elements is 0.8 times of the diameter of the brush element (i.e., T=0.8 d).

In some embodiments, the brush parameter may further include an initial rotation angle $\theta_0$ of the brush element, where the initial rotation angle $\theta_0$ of the brush element is a rotation angle of the brush element at a position of the first interpolation point in the handwriting track curve. That is to say, a pseudo-random angle $\theta_0$ is randomly selected as the rotation angle at the position of the first interpolation point, and the rotation angle θ of the brush element may be the same as or different from the initial rotation angle $\theta_0$ of the brush element. In the embodiment of the present disclosure, as shown in FIG. 14, θ=$\theta_0$. In some embodiments, the initial rotation angle $\theta_0$ may also be 0, i.e., the first brush element is not rotated and the brush elements following the first brush element are rotated at the rotation angle θ.

Figure 15:
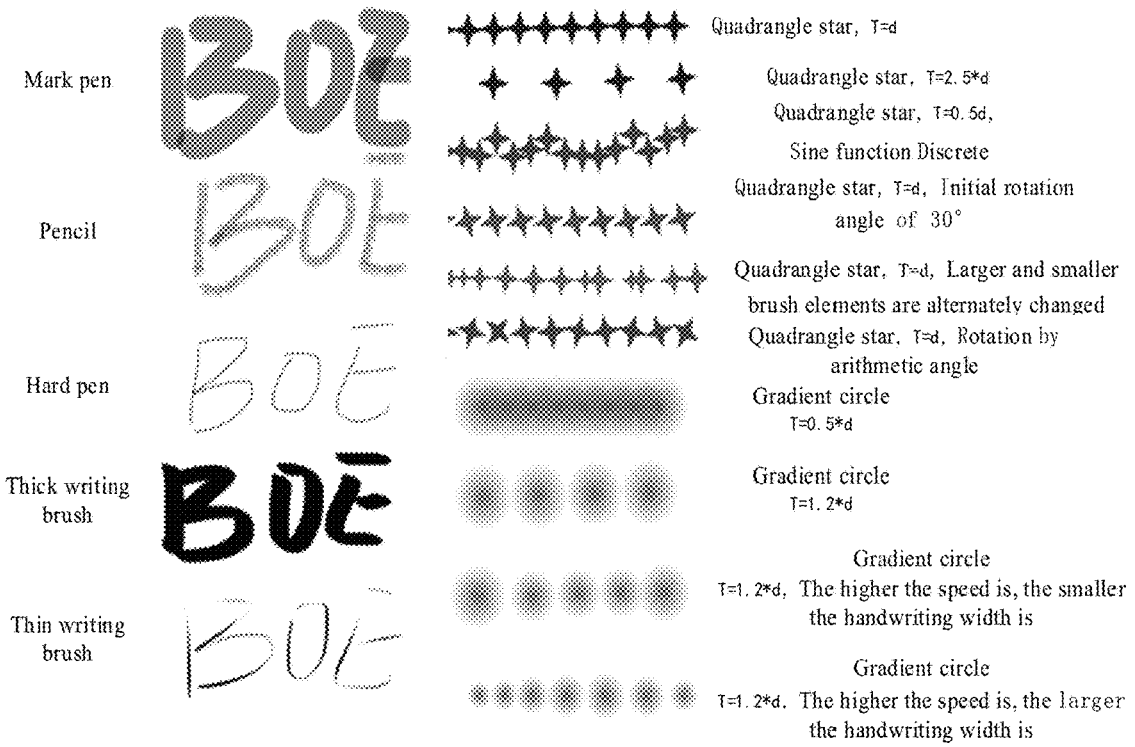
FIG. 15 is a schematic diagram of handwriting effects of various types of pens according to an embodiment of the present disclosure.

In the embodiment of the present disclosure, the interpolation points are selected by adopting the equal arc length interpolation, and the handwriting is generated according to the brush parameters and the handwriting width of the positions of the interpolation point, so that personalized and diversified handwriting effects can be realized. The left side of FIG. 15 shows the handwriting effects of five preset pen types. The right side of FIG. 15 shows the self-defined brush parameters, and the user may select the shapes or patterns of the brush elements, the distance between the brush elements, the diameter of the brush element, the rotation angle, the dispersion degree, the speed change weight, and other parameters of the brush element as required, so as to define the personalized handwriting effect. The handwriting corresponding to various pen types can truly restore characteristics of the corresponding pen types. For the pen types of the thick writing brush and the thin writing brush, the handwriting width of the handwriting may also change as the change of the writing speed, so that the display effect is extremely vivid.

According to the handwriting generating method provided by the embodiment of the present disclosure, the interpolation points are selected in the equal arc length interpolation mode, and drawing are performed at the positions of the interpolation points, so that handwriting styles of various pen types on a drawing board may be simulated. The embodiment of the present disclosure may be applied to the fields of drawing screens and electronic board newspapers, and may also be applied to the fields of large-size (generally more than 50 inches) intelligent display such as conference whiteboards and teaching whiteboards.

In the handwriting generating method provided by the embodiment of the present disclosure, the handwriting of various preset pen types may be presented, corresponding brush parameters may be selected from a graphic library defined by a system to realize the handwriting with a user-defined effect. The user may upload a vector diagram by himself, and then perform self-defined brush design, including designing the handwriting width of the brush element, the distance between the brush elements, the rotation angle of the brush element, the dispersion degree, the speed change weight and the like. In the handwriting generating method provided by the embodiment of the present disclosure, the handwriting generating process can be greatly simplified, steps can be easily performed and the user-defined requirement can be met.

Figure 16:
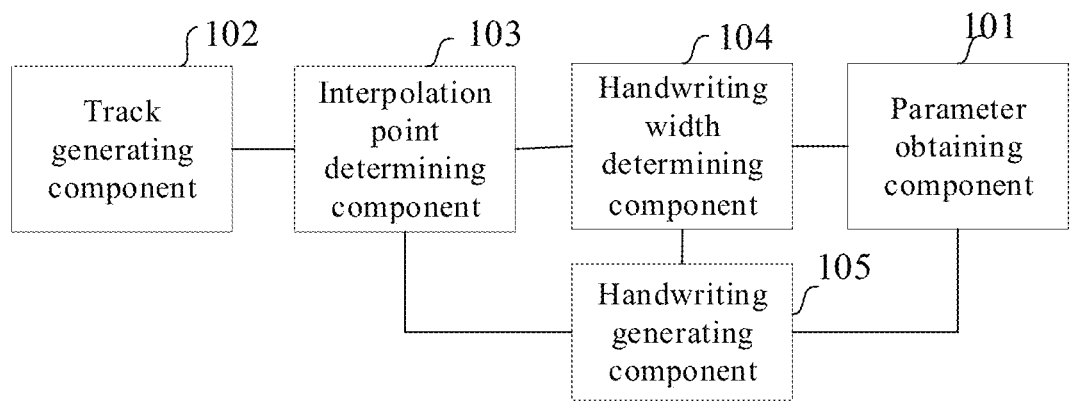
FIG. 16 is a first schematic diagram of a structure of a handwriting generating device according to an embodiment of the present disclosure.

Based on the same technical concept, an embodiment of the present disclosure further provides a handwriting generating device. As shown in FIG. 16, the handwriting generating device includes a parameter obtaining component 101, a track generating component 102, an interpolation point determining component 103, a handwriting width determining component 104, and a handwriting generating component 105.

The parameter obtaining component 101 is configured to obtain brush parameters, wherein the brush parameters are determined according to pen type parameters selected by a user, or the brush parameters are set by the user, and each brush parameter at least includes a shape or a pattern of a brush element.

The track generating component 102 is configured to acquire sampling points of the handwriting track, and generate a handwriting track curve according to the sampling points, and the handwriting track is a track of one of the handwriting segments.

The interpolation point determining component 103 is configured to determine positions of the interpolation points on the handwriting track curve, wherein an arc length between any two adjacent interpolation points on the handwriting track curve is constant.

The handwriting width determining component 104 is configured to determine the handwriting width of the position of the interpolation point according to the brush parameters.

The handwriting generating component 105 is configured to generate the handwriting corresponding to the handwriting track curve according to the brush parameters and the handwriting width.

In some embodiments, the pen type parameters include the first pen type parameter; the handwriting width determining component 104 is configured to determine a position of the first interpolation point, a position of at least one middle interpolation point and a position of the last interpolation point on the handwriting track curve; determine a handwriting width of the position of the first interpolation point, a handwriting width of the position of the at least one middle interpolation point and a handwriting width of the position of the last interpolation point; determine handwriting widths of positions of interpolation points between the first interpolation point and the first middle interpolation point according to the handwriting width of the position of the first interpolation point and the handwriting width of the position of the first middle interpolation point in an interpolation mode, and determine handwriting widths of positions of interpolation points between the last middle interpolation point and the last interpolation point according to the handwriting width of the position of the last middle interpolation point and the handwriting width of the position of the last interpolation point in the interpolation mode.

In some embodiments, the handwriting width determining component 104 is configured to determine the handwriting widths of the positions of the interpolation points between the first interpolation point and the first middle interpolation point, the handwriting widths of the positions of the interpolation points between two adjacent middle interpolation points, and the handwriting widths of the positions of the interpolation points between the last middle interpolation point and the last interpolation point in a linear interpolation mode.

In some embodiments, the handwriting width determining component 104 is further configured to, after the determining the handwriting width of the position of the first interpolation point, the handwriting width of the position of the at least one middle interpolation point and the handwriting width of the position of the last interpolation point, and before the determining handwriting widths of positions of interpolation points between the first interpolation point and the first middle interpolation point according to the handwriting width of the position of the first interpolation point and the handwriting width of the position of the first middle interpolation point in the interpolation mode, and determining handwriting widths of positions of interpolation points between any two adjacent middle interpolation points according to the order of the middle interpolation points and the handwriting widths of the positions of the middle interpolation points in the interpolation mode and determining handwriting widths of positions of interpolation points between the last middle interpolation point and the last interpolation point according to the handwriting width of the position of the last middle interpolation point and the handwriting width of the position of the last interpolation point in the interpolation mode, determine a numerical range of the handwriting width according to the first pen type parameter, a preset standard width D and a preset speed change weight $\lambda$; determine the handwriting width of the position of the first interpolation point, the handwriting width of position of the each middle interpolation point and the handwriting width of the position of the last interpolation point in the numerical range.

In some embodiments, the first pen type parameter includes a first pen subtype parameter and a second pen subtype type parameter, and if the first pen type parameter indicates the first pen subtype parameter, the speed change weight $\lambda$ is less than 1 and greater than 0; if the first pen type parameter is the second pen subtype parameter, the speed change weight $\lambda$ is less than 0 and greater than $-1$.

The handwriting width of the first pen subtype parameter is in a numerical range of $[(1-\lambda) \times D, D]$, and the handwriting width of the second pen subtype parameter is in a numerical range of $[(1+\lambda) \times D, D]$.

In some embodiments, the handwriting width determining component 104 is configured to determine the handwriting width of the position of each of the first interpolation point, the middle interpolation points, and the last interpolation point by: determining an adjusting coefficient corresponding to the interpolation point; and determining the handwriting width of the position of the interpolation point according to the adjusting coefficient and the handwriting width of the position of the previous interpolation point.

In some embodiments, the handwriting width determining component 104 is configured to calculate a writing speed of the interpolation point according to a writing stage of the handwriting track curve and a position of the interpolation point in the handwriting track curve; calculate the adjusting coefficient corresponding to the interpolation point according to the speed change weight, a preset reference writing speed and the writing speed of the interpolation point.

In some embodiments, the handwriting width determining component 104 is configured to calculate the writing speed of the interpolation point as zero in response to the handwriting track curve being in the writing-starting stage or in the stage including writing-starting and writing-stopping and the interpolation point being the first interpolation point in the handwriting track curve.

In some embodiments, the handwriting width determining component 104 is configured to calculate the writing speed of the interpolation point according to the position and moment of the interpolation point and the position and moment of the previous interpolation point in response to the handwriting track curve being in the writing-starting stage or in the stage including writing-starting and writing-stopping or in the writing-stopping stage or in the middle stage and the interpolation point being not the first interpolation point in the handwriting track curve.

In some embodiments, the handwriting width determining component 104 is configured to calculate the writing speed of the interpolation point according to the position and the moment of the interpolation point and the position and the moment of the middle interpolation point of the previous track segment in response to the handwriting track curve being in the writing-stopping stage or the middle stage and the interpolation point being the first interpolation point in the handwriting track curve.

In some embodiments, the moment of the interpolation point is based on the sampling moment of the sampling point corresponding to the interpolation point.

In some embodiments, the handwriting width determining component 104 is configured to determine the handwriting width of the position of the interpolation point according to the adjusting coefficient and the initial handwriting width in response to the handwriting track curve being in the writing-starting stage or in the stage including writing-starting and writing-stopping and the interpolation point being the first interpolation point in the handwriting track curve, wherein the initial handwriting width is determined according to the first pen type parameter.

Figure 17:
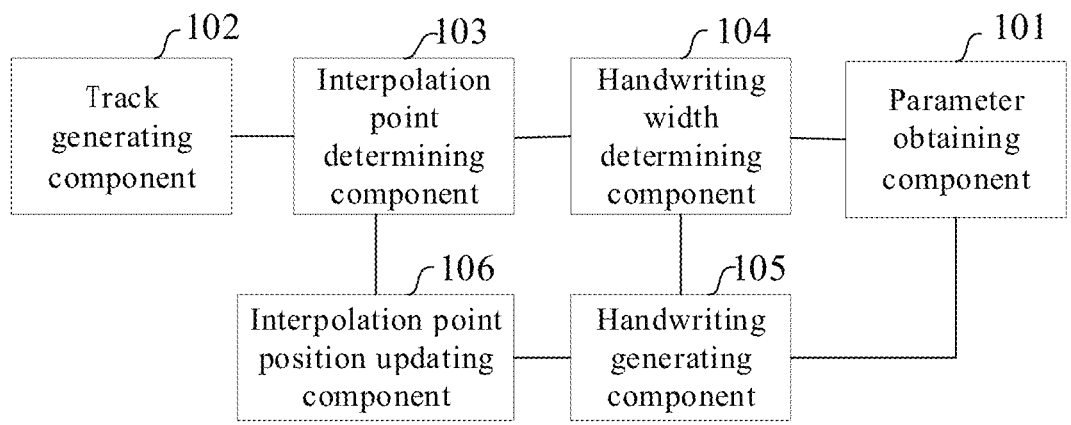
FIG. 17 is a second schematic diagram of a structure of a handwriting generating device according to an embodiment of the present disclosure.

In some embodiments, in a case where the brush parameter is set by the user, the brush parameter includes a dispersion degree S. As shown in FIG. 17, the handwriting generating device further includes an interpolation point position updating component 106 configured to determine a position of a discrete point P'n corresponding to the interpolation point Pn according to the dispersion degree S, and update the position of the interpolation point Pn according to the position of the discrete point P'n, after the determining, by the interpolation point determining component 103, the position of the interpolation point on the handwriting track curve, and before the generating, by the handwriting generating component 105, the handwriting corresponding to the handwriting track curve according to the brush parameter and the handwriting width.

In some embodiments, the interpolation point position updating component 106 is configured to determine the position of a discrete point corresponding to each interpolation point by: calculating a first slope Kn of a connecting line between the interpolation point Pn and a next interpolation point Pn+, and calculating a second slope K'n of a first straight line according to the first slope Kn, the first straight line being perpendicular to the connecting line and passing through the interpolation point Pn; calculating a discrete distance dn of the interpolation point Pn according to a discrete distance adjusting parameter and the dispersion degree S, wherein the discrete distance adjusting parameter changes periodically; determining the position of the discrete point P'n corresponding to the interpolation point Pn according to the discrete distance dn, the position of the interpolation point Pn, and the second slope K'n, wherein the discrete point P'n is located on the first straight line.

In some embodiments, the discrete distance adjustment parameter is determined according to the ordering (that is, sequence number) of the interpolation point Pn on the handwriting track curve.

In some embodiments, the brush parameters further include a rotation angle $\theta$ of the brush element, where the rotation angle $\theta$ of the brush element is an angle difference between two adjacent brush elements, and the angle difference between any two adjacent brush elements is the same, $\pi/4 \leq \theta \leq 3\pi/4$.

In some embodiments, the brush parameters further include an initial rotation angle $\theta_0$ of the brush element, where the initial rotation angle $\theta_0$ of the brush element is a rotation angle of the brush element at a position of the first interpolation point in the handwriting track curve.

In some embodiments, the brush parameters further include at least one of: the distance between the brush elements, the diameter of the brush element; the interpolation point determining component 103 is configured to determine a position of an interpolation point on the handwriting track curve according to the diameter of the brush element and the distance between the brush elements.

In some embodiments, the maximum value of the distance T between the brush elements is determined from the diameter of the brush element and the pen type parameters.

An embodiment of the present disclosure further provides a computer apparatus, including: one or more processors; a storage device having one or more programs stored thereon; the one or more programs, when executed by the one or more processors, cause the one or more processors to implement the handwriting generating method in the above embodiments.

The embodiment of the present disclosure further provides a computer readable medium, on which a computer program is stored, and when the computer program is executed, the handwriting generating method in the above embodiments is implemented.

It should be understood that the above embodiments are merely exemplary embodiments adopted to explain the principles of the present invention/utility model, and the present invention/utility model is not limited thereto. It will be apparent to one of ordinary skill in the art that various changes and modifications may be made therein without departing from the spirit and scope of the present invention/utility model, and such changes and modifications also fall within the scope of the present invention/utility model.

What is claimed is:

1. A method for generating like-handwritten writing, wherein the like-handwritten writing comprises at least one writing segment formed by a brush, and each writing segment is generated by:
    obtaining brush parameters, wherein the brush parameters are determined according to pen type parameters selected by a user, or the brush parameters are set by the user, and each brush parameter at least comprises a shape or a pattern of a brush element;
    acquiring sampling points of a handwriting track, and generating a handwriting track curve according to the sampling points, wherein the handwriting track is a track of a user's actual handwriting;
    determining positions of interpolation points on the handwriting track curve by performing interpolation such that an arc length between any two adjacent interpolation points on the handwriting track curve is constant by using an iterative algorithm; and
    determining a handwriting width of the position of the interpolation point according to the brush parameters, and generating the like-handwritten writing corresponding to the handwriting track curve according to the brush parameters and the handwriting width.

2. The method of claim 1, wherein the pen type parameters indicate a first pen type parameter; and the determining the handwriting width of the position of the interpolation point according to the brush parameters, comprises:
    determining a position of a first interpolation point, a position of at least one middle interpolation point and a position of a last interpolation point on the handwriting track curve;
    determining a handwriting width of the position of the first interpolation point, a handwriting width of the position of the at least one middle interpolation point and a handwriting width of the position of the last interpolation point; and
    determining handwriting widths of positions of interpolation points between the first interpolation point and a first one of the at least one first middle interpolation point according to the handwriting width of the position of the first interpolation point and the handwriting width of the position of the first one of the at least one middle interpolation point in an interpolation mode, and determining handwriting widths of positions of interpolation points between a last one of the at least one middle interpolation point and the last interpolation point according to the handwriting width of the position of the last one of the at least one middle interpolation point and the handwriting width of the position of the last interpolation point in the interpolation mode.

3. The method of claim 2, wherein the handwriting widths of the positions of the interpolation points between the first interpolation point and the first one of the at least one middle interpolation point, and the handwriting widths of the positions of the interpolation points between the last one of the at least one middle interpolation point and the last interpolation point are determined in a linear interpolation mode.

4. The method of claim 2, wherein after the determining the handwriting width of the position of the first interpolation point, the handwriting width of the position of the at least one middle interpolation point and the handwriting width of the position of the last interpolation point, before the determining handwriting widths of positions of interpolation points between the first interpolation point and the first one of the at least one middle interpolation point according to the handwriting width of the position of the first interpolation point and the handwriting width of the position of the first one of the at least one middle interpolation point in the interpolation mode, and determining handwriting widths of positions of interpolation points between the last one of the at least one middle interpolation point and the last interpolation point according to the handwriting width of the position of the last one of the at least one middle interpolation point and the handwriting width of the position of the last interpolation point in the interpolation mode, the method further comprises:
  determining a numerical range of the handwriting width according to the first pen type parameter, a preset standard width D and a preset speed change weight 2; and
  determining the handwriting width of the position of the first interpolation point, the handwriting width of position of the each middle interpolation point and the handwriting width of the position of the last interpolation point in the numerical range.

5. The method of claim 4, wherein the first pen type parameter comprises a first pen subtype parameter and a second pen subtype parameter, and in a case where the first pen type parameter indicates the first pen subtype parameter, the speed change weight $\lambda$ is less than 1 and greater than 0; in a case where the first pen type parameter indicates the second pen subtype parameter, the speed change weight $\lambda$ is less than 0 and greater than $-1$; and
  the handwriting width of the first pen subtype parameter is in a numerical range of $[(1-\lambda) \times D, D]$, and the handwriting width of the second pen subtype type parameter is in a numerical range of $[(1+\lambda) \times D, D]$.

6. The method of claim 4, wherein the handwriting width of the position of each of the first interpolation point, the middle interpolation point, and the last interpolation point is determined by:
  determining an adjusting coefficient corresponding to the interpolation point; and
  determining the handwriting width of the position of the interpolation point according to the adjusting coefficient and the handwriting width of the position of a previous interpolation point.

7. The method of claim 6, wherein the determining the adjusting coefficient corresponding to the interpolation point, comprises:
  calculating a writing speed of the interpolation point according to a writing stage of the handwriting track curve and a position of the interpolation point on the handwriting track curve; and
  calculating the adjusting coefficient corresponding to the interpolation point according to the speed change weight, a preset reference writing speed and the writing speed of the interpolation point.

8. The method of claim 7, wherein the calculating a writing speed of the interpolation point according to a writing stage of the handwriting track curve and a position of the interpolation point on the handwriting track curve, comprises:
  calculating the writing speed of the interpolation point as zero in response to the handwriting track curve being in a writing-starting stage or in a stage comprising writing-starting and writing-stopping and the interpolation point being the first interpolation point in the handwriting track curve.

9. The method of claim 7, wherein the calculating a writing speed of the interpolation point according to a writing stage of the handwriting track curve and a position of the interpolation point in the handwriting track curve, comprises:
  calculating the writing speed of the interpolation point according to the position and a moment of the interpolation point and the position and a moment of the previous interpolation point in response to the handwriting track curve being in a writing-starting stage or in a stage comprising writing-starting and writing-stopping or in a writing-stopping stage or in a middle stage and the interpolation point being not the first interpolation point in the handwriting track curve.

10. The method of claim 7, wherein the calculating a writing speed of the interpolation point according to a writing stage of the handwriting track curve and a position of the interpolation point in the handwriting track curve, comprises:
  calculating the writing speed of the interpolation point according to the position and a moment of the interpolation point and the position and a moment of the middle interpolation point of a previous track segment in response to the handwriting track curve being in a writing-stopping stage or a middle stage and the interpolation point being the first interpolation point in the handwriting track curve.

11. The method of claim 9, wherein the moment of the interpolation point is based on a sampling moment of the sampling point corresponding to the interpolation point.

12. The method of claim 6, wherein the determining the handwriting width of the position of the interpolation point according to the adjusting coefficient and the handwriting width of the position of the previous interpolation point of the interpolation point, comprises:
  determining the handwriting width of the position of the interpolation point according to the adjusting coefficient and an initial handwriting width in response to the handwriting track curve being in a writing-starting stage or in a stage comprising writing-starting and writing-stopping and the interpolation point being the first interpolation point in the handwriting track curve, wherein the initial handwriting width is determined according to the first pen type parameter.

13. The method of claim 1, wherein the brush parameter is set by the user, the brush parameter comprises a dispersion degree S; after the determining the position of the interpolation point on the handwriting track curve, and before the generating the handwriting corresponding to the handwriting track curve according to the brush parameter and the handwriting width, the method further comprises: determining a position of a discrete point P'n corresponding to the interpolation point Pn according to the dispersion degree S, and updating the position of the interpolation point Pn according to the position of the discrete point P'n.

14. The method of claim 13, wherein the position of the discrete point corresponding to the interpolation point is determined by:
  calculating a first slope Kn of a connecting line between the interpolation point Pn and a next interpolation point Pn+1, and calculating a second slope K'n of a first straight line according to the first slope Kn, wherein the first straight line is perpendicular to the connecting line and passes through the interpolation point Pn;
  calculating a discrete distance dn of the interpolation point Pn according to a discrete distance adjusting parameter and the dispersion degree S, wherein the discrete distance adjusting parameter changes periodically; and determining the position of the discrete point P'n corresponding to the interpolation point Pn according to the discrete distance dn, the position of the interpolation point Pn, and the second slope K'n, wherein the discrete point P'n is located on the first straight line.

15. The method of claim 14, wherein the discrete distance adjustment parameter is determined according to an ordering of the interpolation point Pn on the handwriting track curve.

16. The method of claim 1, wherein the brush parameters further comprise a rotation angle θ of the brush element, where the rotation angle θ of the brush element is an angle difference between two adjacent brush elements, and the angle difference between any two adjacent brush elements is a same, and $\pi/4 \leq \theta \leq 3\pi/4$, and wherein the brush parameters further comprise an initial rotation angle $\theta_0$ of the brush element, where the initial rotation angle $\theta_0$ of the brush element is a rotation angle of the brush element at a position of a first interpolation point on the handwriting track curve.

17. The method of claim 1, wherein the brush parameters further comprise at least one of: a distance between the brush elements, a diameter of the brush element;

the determining the position of the interpolation point on the handwriting track curve comprises:

determine the position of the interpolation point on the handwriting track curve according to the diameter of the brush element and the distance between the brush elements, and wherein a maximum value of the distance between the brush elements is determined from the diameter of the brush element and the pen type parameters.

18. A computer apparatus, comprising:
one or more processors; and
a storage device having one or more programs stored thereon, wherein the one or more programs, when executed by the one or more processors, cause the one or more processors to implement the method for generating handwriting according to claim 1.

19. A non-transitory computer-readable storage medium, on which a computer program is stored, wherein the computer program, when executed, implements the method for generating handwriting according to claim 1.

20. A like-handwritten writing generating device, comprising a parameter obtaining component, a track generating component, an interpolation point determining component, a handwriting width determining component, and a handwriting generating component, wherein the parameter obtaining component is configured to obtain brush parameters, wherein the brush parameters are determined according to pen type parameters selected by a user, or the brush parameters are set by the user, and each brush parameter at least comprises a shape or a pattern of a brush element;

the track generating component is configured to acquire sampling points of a handwriting track, and generate a handwriting track curve according to the sampling points, wherein the handwriting track is a track of a user's actual handwriting;

the interpolation point determining component is configured to determine positions of interpolation points on the handwriting track curve by performing interpolation such that an arc length between any two adjacent interpolation points on the handwriting track curve is constant by using an iterative algorithm;

the handwriting width determining component is configured to determine a handwriting width of the position of the interpolation point according to the brush parameters; and the handwriting generating component is configured to generate the like-handwritten writing corresponding to the handwriting track curve according to the brush parameters and the handwriting width.

* * * * *